US006271858B1

(12) United States Patent
Dalal et al.

(10) Patent No.: US 6,271,858 B1
(45) Date of Patent: Aug. 7, 2001

(54) INCREMENTAL UPDATE FOR DYNAMIC/ANIMATED TEXTURES ON THREE-DIMENSIONAL MODELS

(75) Inventors: Ketan K. Dalal; Ian B. Pieragostini, both of Seattle; Stephen J. Lacey, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/174,086

(22) Filed: Oct. 16, 1998

(51) Int. Cl.[7] .......................... G06T 15/00; G06T 11/40; G06F 17/30
(52) U.S. Cl. ......................... 345/430; 345/419; 345/425; 700/10; 700/104; 700/102
(58) Field of Search ..................................... 345/419, 425, 345/430, 433, 420, 421, 422, 429; 707/3, 4, 10, 100, 102, 513, 515, 516, 517, 530; 709/203, 217

(56) References Cited

U.S. PATENT DOCUMENTS

| 4,549,275 | * | 10/1985 | Sukonick | 364/521 |
| 4,974,176 | * | 11/1990 | Buchner | 364/522 |
| 5,696,892 | * | 12/1997 | Redmann | 395/125 |
| 5,760,783 | * | 6/1998 | Migdal | 345/430 |
| 5,801,711 | * | 9/1998 | Koss | 345/441 |
| 5,893,109 | * | 4/1999 | DeRose | 707/10 |
| 5,895,476 | * | 4/1999 | Orr | 707/517 |
| 6,023,278 | * | 2/2000 | Margolin | 345/419 |
| 6,026,417 | * | 2/2000 | Ross | 707/3 |
| 6,055,544 | * | 4/2000 | DeRose | 707/10 |
| 6,111,578 | * | 8/2000 | Tesler | 345/427 |
| 6,125,385 | * | 8/2000 | Wies | 345/163 |
| 6,151,610 | * | 4/1999 | Senn | 707/516 |

FOREIGN PATENT DOCUMENTS

9717676A1 * 5/1997 (EP) .............................. G06T/15/50

11175739 * 7/1999 (JP) .............................. G06T/11/00

OTHER PUBLICATIONS

On–line use of off–line derived mapping . . . (Budenske, J.R.; pp. 96–110) IEEE Catalog No.:97TB100103, Apr. 1997.*

Head tracking via robust registration in texture map images; La Cascia, M.; pp. 508–514 IEEE Publication, Jun. 1998.*

Volume rendering for 3–D echocardiography visualization; A Sarti et al.; pp. 209–211 IEEE Publication, 1993.*

Adaptive maximization of lossless compression of satellite images; Robert J. Steward, pp. 317–319 IEEE publication, 1994.*

\* cited by examiner

Primary Examiner—Matthew Luu
Assistant Examiner—Wesner Sajous
(74) Attorney, Agent, or Firm—Christensen O'Connor Johnson Kindness PLLC

(57) ABSTRACT

A method, system and computer-readable medium for efficiently rendering changed portions of a document stored in a texture image file that is mapped to a generated three-dimensional model. The system includes a display device, a memory for storing texture image files, and a processor coupled to the display device and the memory. The processor includes a document component for determining the portions in a document that will change based on the input event, determining the locations of the determined portions that will change based on the input event, rendering the determined portions in the document that will change based on the input event, and storing the rendered portions within a texture image file. The processor also includes a three-dimensional component for determining the locations in the texture image file of the stored rendered portions based on the determined locations of the portions, and mapping the changed portions to the generated three-dimensional model based on the determined locations in the texture image file of the stored rendered portions.

15 Claims, 5 Drawing Sheets

US 6,271,858 B1

INCREMENTAL UPDATE FOR DYNAMIC/ANIMATED TEXTURES ON THREE-DIMENSIONAL MODELS

FIELD OF THE INVENTION

This invention relates to computer-generated documents and, more particularly, to computer-generated dynamic documents rendered on three-dimensional models.

BACKGROUND OF THE INVENTION

Many times when interacting with a dynamic document, such as a page generated by a server on the World Wide Web or an animated image, such as that with Moving Pictures Experts Group (MPEG) formatting, only a portion of the document is changed. For example, a frame changes in a document that includes multiple frames as a result of an input at the user's system or an automatic response from the server originally generating the document. When only a portion of the document changes, the entire document is regenerated by a document renderer on the user's system, such as a markup document renderer for rendering markup documents, an arbitrary two-dimensional engine, etc. Regenerating the entire document when only a portion of the document changes results in unnecessary processing. A process in standard two-dimensional graphics called "dirty-rect" or "sub-rect" processing resolves this processing deficiency. Dirty-rect processing identifies the changed portions of a document as rectangles and only rerenders the identified rectangles; then, document information that has not changed is kept in display memory. Thus, dirty-rect processing does not need to render the unchanged portions of a document, thereby increasing the speed of the system by not performing unnecessary image rendering.

When a document is assigned as texture on a three-dimensional model, the three-dimensional processor or engine takes the document that is rendered by a document renderer and maps it to the three-dimensional model. When a change occurs in a portion of the mapped document, the three-dimensional engine will remap the entire document regardless of how little has changed on the document. The process of applying a document or image as texture to a three-dimensional model may first require translating or modifying the document or image before using it as texture. For example, the three-dimensional processor may need to copy the document or image to video memory, to resize it, or change the pixel format. Even if dirty-rect processing is implemented by the document renderer, the three-dimensional engine still must remap the entire texture and perform any other required and sometimes lengthy processing. When documents are used as texture, the technique of dirty-rect processing only reduces processing performed by the document renderer. As a result, there exists a need for reducing the unnecessary three-dimensional engine mapping of the unchanged portions of a document.

The present invention is directed to overcoming the foregoing and other disadvantages. More specifically, the present invention is directed to providing a method, system and computer-readable medium suitable for efficient image rendering of dynamically changing document textures mapped on three-dimensional models.

SUMMARY OF THE INVENTION

In accordance with this invention a method, system and computer-readable medium for efficiently rendering changed portions of a document stored in a texture image file that is mapped to a generated three-dimensional model is provided. The system includes a display device, a memory for storing texture image files, and a processor coupled to the display device and the memory. The processor includes a document component for determining the portions in a document that will change based on an input event (such as a user selection of hyperlinked text), determining the locations of the determined portions that will change based on the input event, rendering the determined portions in the document that will change based on the input event, and storing the rendered portions within a texture image file. The processor also includes a three-dimensional component for determining the locations in the texture image file of the stored rendered portions based on the determined locations of the portions, and mapping the changed portions to the generated three-dimensional model based on the determined locations in the texture image file of the stored rendered portions.

In accordance with other aspects of this invention, the document component further determines at least one rectangular area that encloses the determined portions that will change and the three-dimensional component further determines at least one texture rectangular area that corresponds to the determined at least one rectangular area, and maps the information within the determined at least one texture rectangular area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In accordance with the present invention, a method, system and computer-readable medium for mapping only the changed portions of documents that are assigned as textures on three-dimensional models are provided. As a result, the processing time for updating a three-dimensional image is greatly reduced.

In one embodiment, a markup language instructs a printer or video display how to present a markup document using content and format information and how to index or link the contents of the markup document using linking information. In other words, the markup language may contain instructions that allow the displayed representation to be interactive, dynamic and/or self-modifying. The displayed markup documents may include user-interface elements, such as buttons, events, listboxes, dropdowns, scrollbars, layout, text, three-dimensional party controls (like plugins, ActiveX controls, Shockwave), images, animation, timer services, alignment, flow-control, scripting languages, and the like. The user-interface element may be a link element that is in the form of graphical images and/or text that are hyperlinked to another document, file or script. Thus, like user-interface elements included in two-dimensional markup documents, the user-interface elements included in the displayed three-dimensional model allow users to interact with the texture of the three-dimensional model. With link elements, jumps to another document, file, script, or to another document, file or script to be included on the texture of a displayed three-dimensional model are possible. As will be readily appreciated by those of ordinary skill in computer graphics, a texture image file constitutes a unit of information representing a rendered HTML document that is either located in memory or in a storage location on a disk.

Markup documents may also include embedded sound sources. When a three-dimensional model includes a markup document with an embedded sound source, a multimedia processor, such as DirectX, combines the sound generated by the sound source with the three-dimensional model. The sound is played back through a speaker system to convey where the corresponding markup document is located on the three-dimensional model.

Figure 1:
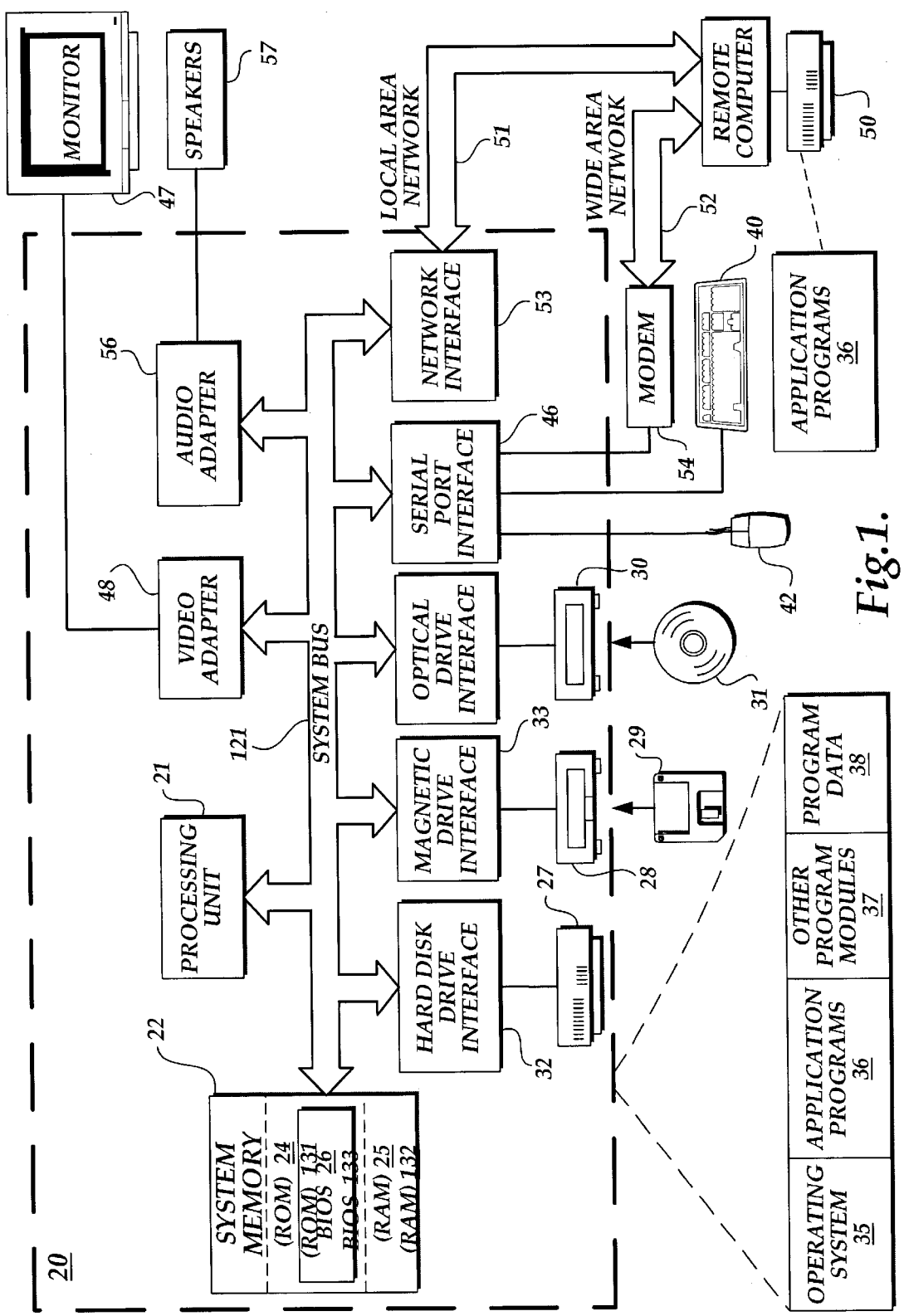
FIGS. 1 and 2 are block diagrams of general purpose computer systems for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention, implemented on a system of the type illustrated in FIG. 1 and described above, improves the mapping of partially updated markup documents with or without user-interface elements to assigned three-dimensional models.

Figure 2:
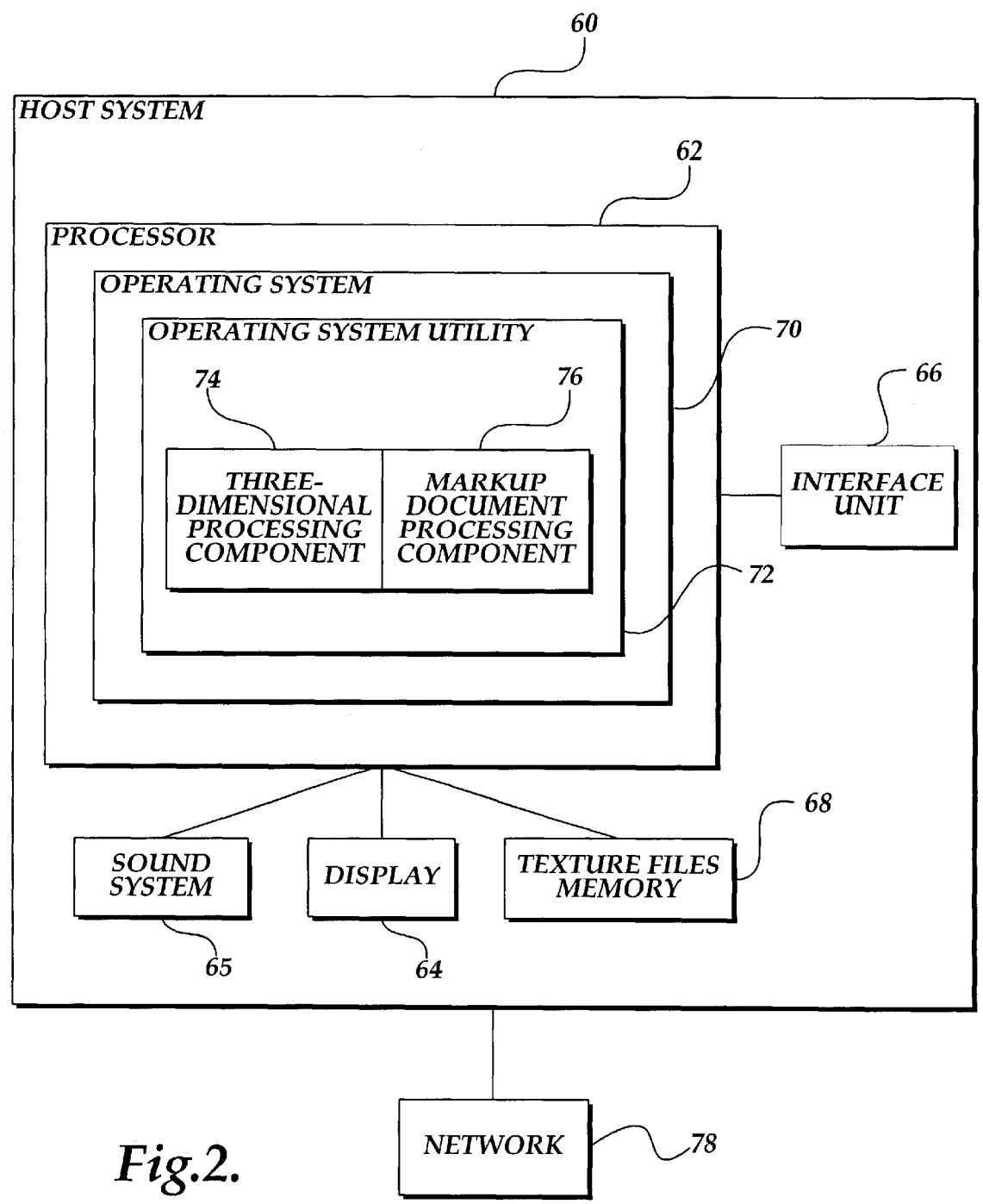

FIG. 2 illustrates the structural components, hardware and software components, included within a user's host system 60 that are required for performing the process of the present invention when the textures include markup documents. The host system 60 includes a processor 62, a display 64, a sound system 65, an interface unit 66, and internal or external memory 68 for holding texture image files. The processor 62 is controlled by an operating system 70 that includes an operating system utility 72, such as a web browser. The operating system utility 72 includes a three-dimensional processing component 74 and a markup document processing component 76. The host system 60 is coupled to a network 78 for receiving information for display. Received information includes content, format and linking information that defines what information (content) is to be presented on the display 64 and through the sound system 65, how (format) the information is to be presented on the display 64 and through the sound system 65 and how user interactions will be processed (linking). As will be readily appreciated by those skilled in the computer art, the processing components described above may be distributed over a network.

The information received by the host system 60 from the network 78 is requested by the host system's user or automatically sent by a remote server coupled to the host system 60 via the network 78. The received information is analyzed by the operating system utility 72 and its components. If the operating system utility 72 determines that the received information includes one or more markup document that is to be displayed in a three-dimensional model(s), the markup document processing component 76 generates the markup documents and stores the generated markup documents in texture image files in the memory 68 that relate to the to-be-created three-dimensional model. Then, the three-dimensional processing component 74 renders the three-dimensional model(s) and maps the markup documents stored in the texture image files related to the rendered three-dimensional model(s). The format information provides the instructions for the storing of the markup documents in texture image files, the presenting of sound and the rendering of the three-dimensional model(s). If the received information directs display of a two-dimensional non-markup document for display in a three-dimensional model, the operating system utility 72 performs display generation according to currently practiced techniques.

In one embodiment of the present invention the three-dimensional model processing component is implemented in software, such as DirectX. The markup document processing component is also implemented in software, such as a Hypertext Markup Language (HTML) renderer. As will be readily appreciated by those of ordinary skill in the art of markup documents, the markup documents may be rendered by the markup processing component from content information stored within the system memory 22, the hard disk drive 27, the magnetic disk drive 28, the optical disk drive 30, or on remote devices located on one of the networks 51 and 52 (FIG. 1).

Figure 3:
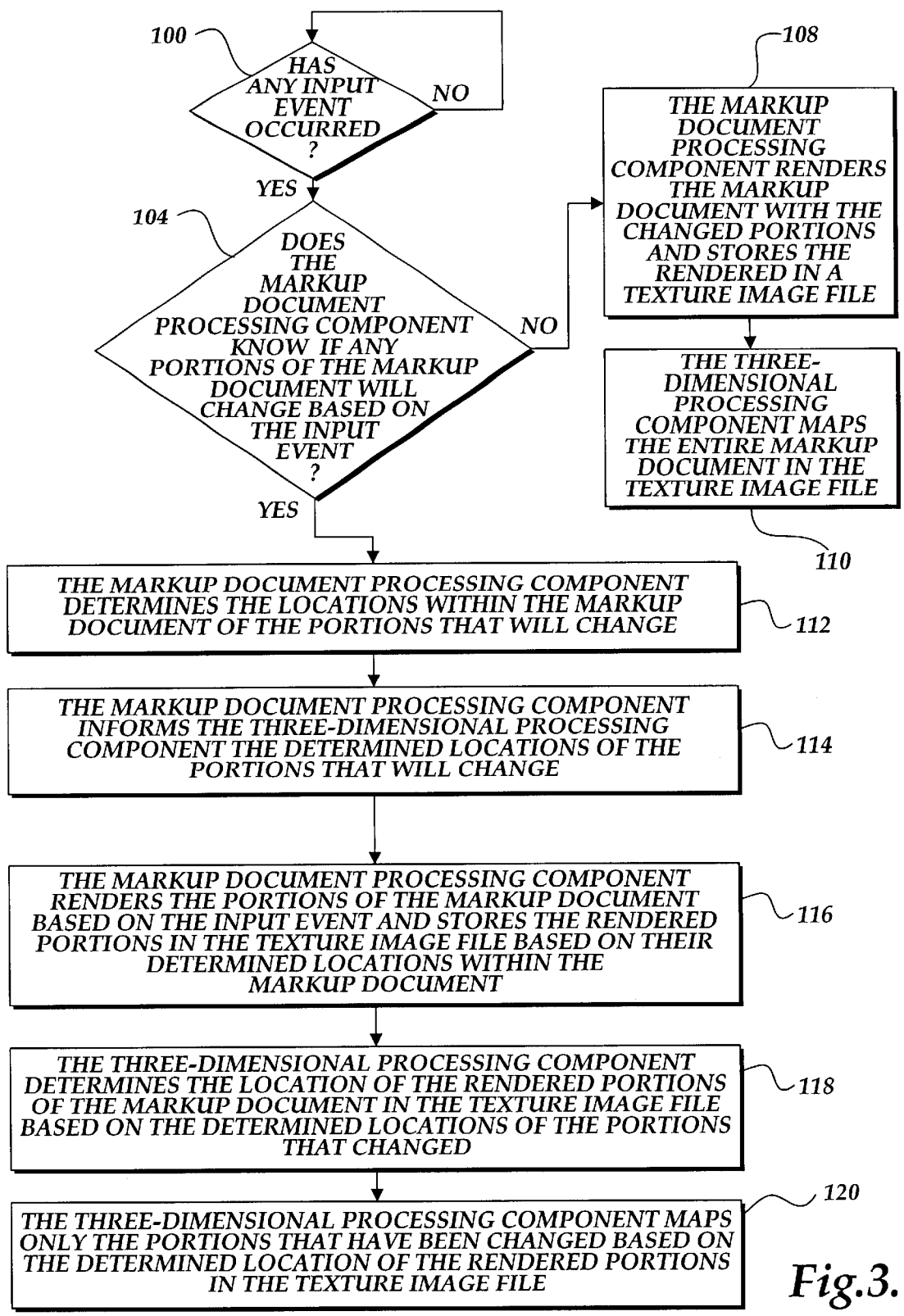
FIG. 3 is a flow diagram illustrating an embodiment of the invention for providing efficient rendering of markup documents as texture on three-dimensional models.

For the purpose of the description of the present, the term markup document refers to various types of documents and images where it can be determined by its respective rendering component that portions of the document or image has changed. FIG. 3 is a flow diagram of the process of the present invention for efficiently rendering markup documents or images in the textures of three-dimensional models. First, at decision block 100, the process of the present invention begins if it is determined an input event has occurred. An input event may be a user selection of a hyperlinked item or an automatic delivery of information by the server that is the source of the markup document. If no input event has occurred, the process waits until an input event does occur. If an input event change has occurred, then, at decision block 104, the process determines if the markup document processing component 76 knows what portions of the markup document will change based on the input event. As will be readily appreciated by those skilled in markup document rendering, the markup document processing component 76 usually knows, because of dirty-rect processing or some other similar technique, what portions of the markup document have changed. If the markup document processing component 76 cannot determine what portions will change on the markup document, the markup document processing component 76 renders the entire markup document with the changed portions and stores the generated markup document in the assigned three-dimensional model's texture image file. See block 108. Then, at block 110, the three-dimensional processing component 74 maps the entire markup document that is stored in the texture image file.

If, at decision block 104, the markup document processing component 76 does know what portions will change in the markup document, the markup document processing component 76 determines the locations within the markup document of the portions that will change. See block 112. In this step, the markup document processing component 76 identifies the rectangular dimensions for the portions in the markup document that will change. At block 114, the markup document processing component 76 informs the three-dimensional processing component about the determined locations of the portions that will change. At block 116, the markup document processing component 76 renders the portions of the markup document based on the input event and stores the rendered portions in the assigned texture image file based on their determined locations within the markup document. Then, at block 118, the three-dimensional processing component 74 determines the location of the rendered portions of the markup document in the texture image file based on the determined locations of the portions that changed. Finally, at block 120, the three-dimensional processing component 74 maps only the portions that have been changed based on the determined location of the rendered portions in the texture image file.

Figure 4:
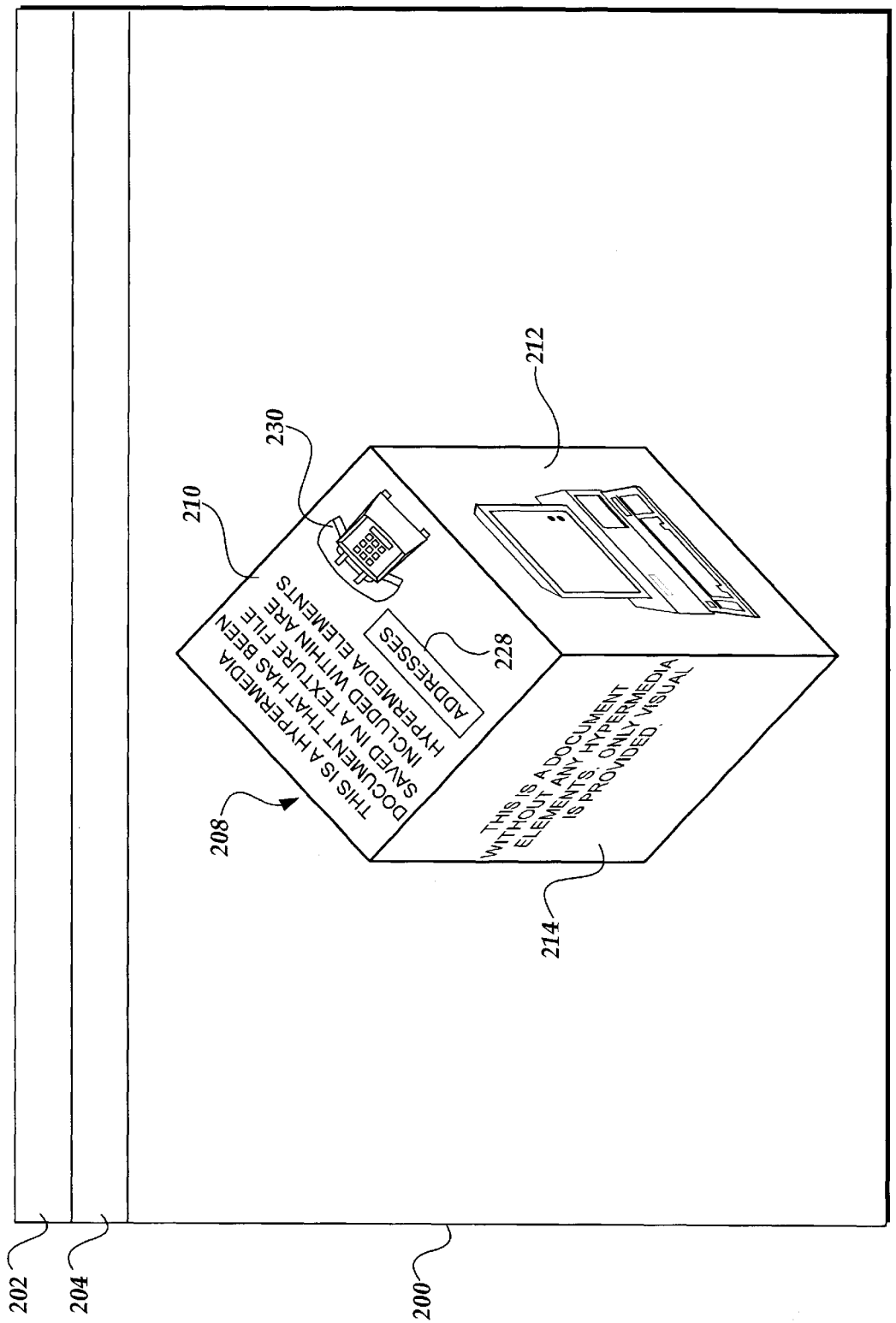
FIG. 4 is a screen shot of received information displayed as a three-dimensional model of a box with markup documents displayed as texture on the box.

FIG. 4 is an example screen shot of a window 200 generated by the operating system utility 72 (FIG. 2) according to received content, format and linking information. The window 200 includes a title bar 202, a menu, command or button bar 204, and a display area 206. The window 200 is generated by the operating system utility 72 for display on a desktop in a windows-based operating system. Within the display area 206 is a three-dimensional model 208, which is shown as a box with six sides, three of which are visible 210, 212 and 214. The markup document information stored in a texture image file is mapped to each side by the three-dimensional processing component 74. The texture image files mapped to visible sides 210 and 212 include a markup document with user-interface elements that are link elements. Before the three-dimensional processing component 74 renders any three-dimensional model(s) and maps the texture image files to the rendered model(s), the markup processing component 76 generates the markup documents included or identified in the received content information and stores the generated markup documents into texture image files according to the received format information.

A user can interact with the link elements or other user-interface elements in markup documents displayed on a three-dimensional model texture in the same way a user interacts with them in two-dimensional markup documents. The user uses a mouse or other cursor control device to place a cursor on a link element and activates the cursor control device. The cursor control device activation selects the link element that causes the operating system utility 72 to retrieve information according to an address preassigned to the link element. The retrieved information includes linking information that includes a predesignated link mode or action.

Figure 5A:
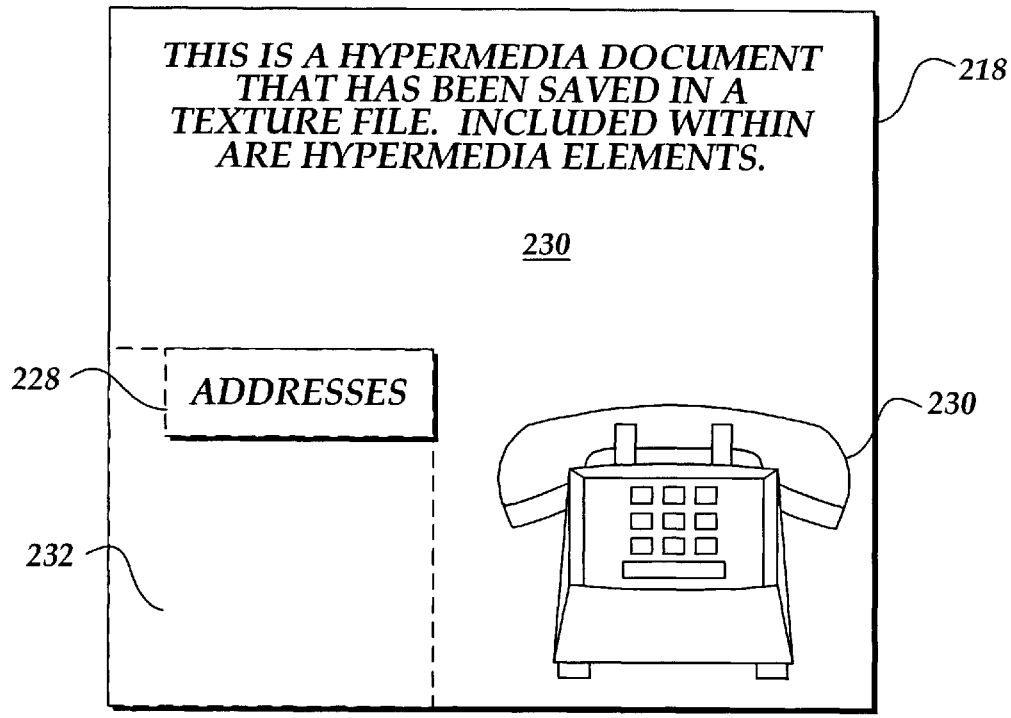
FIGS. 5A and 5B are illustrations of a markup document with a changed portion that is mapped to a three-dimensional model shown in FIG. 4.
Figure 5B:
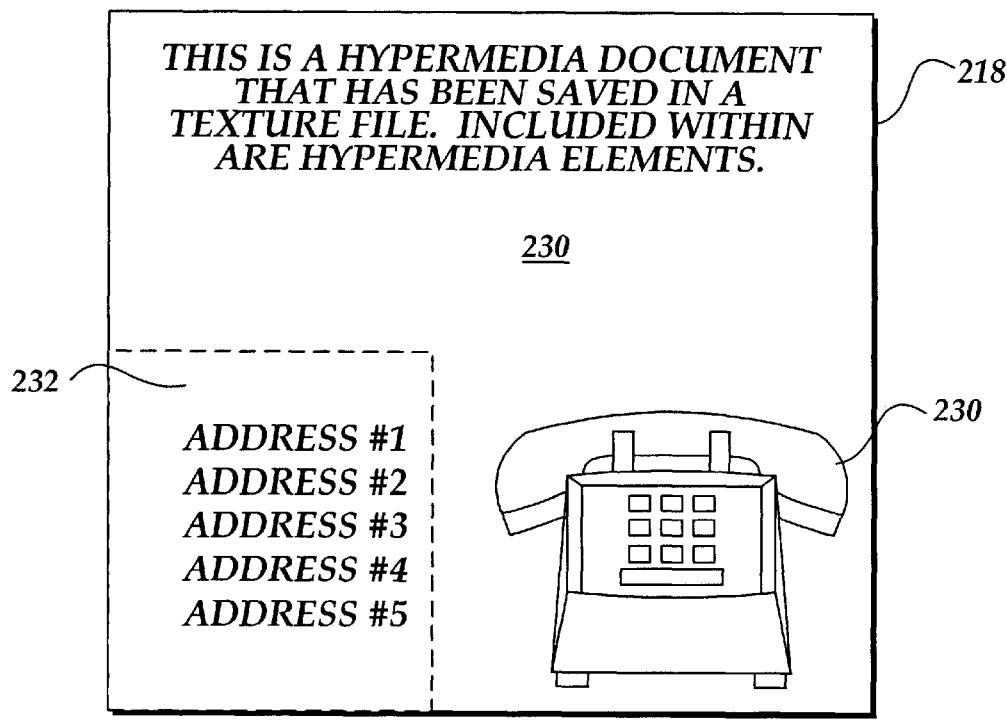

FIGS. 5A and 5B illustrate the markup documents 218 for the texture of the visible side 210 of the three-dimensional model 208 shown in FIG. 4. The markup document 218 includes a first link element 228 that is a text user-interface element and a second link element 230 that is an image user-interface element. The first link element 228 is the word "ADDRESS." When a user activates the first link element 228, the markup document processing component determines that a rectangular area 232 within the markup document 218 will change.

The dimensions and location of the rectangular area 232 within the markup document 218 are determined and sent to the three-dimensional processing component 74. The markup document processing component 76 renders only the new information, the list of addresses, in the determined rectangular area 232 and stores the rendered information in the corresponding texture image file. Then, the three-dimensional processing component 74 determines the changed area of the texture image file based on the received dimensions and location of the rectangular area 232 within the markup document 218. Finally, the three-dimensional processing component 74 maps only the newly rendered information in the determined changed area.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for changing a document stored in a texture image file that is mapped to a generated three-dimensional model when an input event occurs, said method comprising:
   determining a portion in a document that will change based on the input event;
   determining a location of the determined portion that will change based on the input event;
   rendering the determined portion in the document that will change based on the input event;
   storing the rendered portion within a texture image file;
   determining a location in the texture image file of the stored rendered portion based on the determined location of the portion; and
   mapping the changed portion to the generated three-dimensional model based on the determined location in the texture image file of the stored rendered portion.

2. The method of claim 1, further comprising:
   receiving an input event.

3. The method of claim 2, wherein receiving an input event is an automatic reception of information.

4. The method of claim 2, wherein determining the location of the determined portion that will change based on the input event further comprises:
   determining at least one rectangular area that encloses the determined portion that will change.

5. The method of claim 4, wherein;
   determining the location in the texture image file of the stored rendered portion based on the determined location of the portion, further comprises determining at least one texture rectangular area that corresponds to the determined at least one rectangular area; and
   mapping the changed portion based on the determined location in the texture image file of the stored rendered portion, further comprises, mapping the information within the determined at least one texture rectangular area.

6. A system for changing a document stored in a texture image file that is mapped to a generated three-dimensional model when an input event occurs, said system comprising:
   (a) a display device;
   (b) a memory for storing texture images; and
   (c) a processor coupled to the display device and the memory, said processor comprises:
      (i) a document component for determining a portion in a document that will change based on the input event, determining a location that will change based on the input event, rendering the determined portion in the document that will change based on the input event, and storing the rendered portion within a texture image file; and
      (ii) a three-dimensional component for determining a location in the texture image file of the stored rendered portion based on the determined location of the portion, and mapping the changed portion to the generated three-dimensional model based on the determined location in the texture image file of the stored rendered portion.

7. The system of claim 6, wherein said processor further comprises:
   a receiving component for receiving an input event.

8. The system of claim 7, wherein receiving an input event is an automatic reception of information.

9. The system of claim 7, wherein the document component further determines at least one rectangular area that encloses the determined portion that will change.

10. The system of claim 9, wherein the three-dimensional component further determines at least one texture rectangular area that corresponds to the determined at least one rectangular area, and maps the information within the determined at least one texture rectangular area.

11. A computer-readable medium for changing a document stored in a texture image file that is mapped to a generated three-dimensional model when an input event occurs, said computer-readable medium comprising:
   a document component for determining a portion in a document that will change based on the input event, determining a location of the determined portion that will change based on the input event, rendering the determined portion in the document that will change based on the input event, and storing the rendered portion within a texture image file; and
   a three-dimensional component for determining a location in the texture image file of the stored rendered portion based on the determined location of the portion, and mapping the changed portion to the generated three-dimensional model based on the determined location in the texture image file of the stored rendered portion.

12. The computer-readable medium of claim 11, wherein said processor further comprises:
   a receiving component for receiving an input event.

13. The computer-readable medium of claim 12, wherein receiving an input event is an automatic reception of information.

14. A computer-readable medium of claim 12, wherein the document component further determines at least one rectangular area that encloses the determined portion that will change.

15. The computer-readable medium of claim 14, wherein the three-dimensional component further determines at least one texture rectangular area that corresponds to the determined at least one rectangular area, and maps the information within the determined at least one texture rectangular area.

* * * * *

UNITED STATES PATENT AND TRADEMARK OFFICE
CERTIFICATE OF CORRECTION

PATENT NO. : 6,271,858 B1
DATED : August 7, 2001
INVENTOR(S) : K.K. Dalal et al.

It is certified that error appears in the above-identified patent and that said Letters Patent is hereby corrected as shown below:

Column 3,
Line 2, "text that are" should read -- text that is --

Column 4,
Line 66, "components, included" should read -- components included --

Column 5,
Line 27, "that is to be" should read -- that are to be --
Line 43, "model processing component" should read -- model processing component 74 --
Line 45, "ing component" should read -- ing component 76 --
Line 49, "by the markup processing component" should read -- by the markup document processing component 74 --
Line 54, "of the present," should read -- of the present invention, --
Line 55, "markup document refers" should read -- "markup document" refers --
Line 57, "or image has" should read -- or image have --

Column 6,
Line 24, "three-dimensional processing component" should read
-- three-dimensional processing component 74 --

Column 8,
Line 7, "location that will change" should read -- location of the determined portion that will change --
Line 57, "A computer-readable" should read -- The computer-readable --

Signed and Sealed this

Twentieth Day of May, 2003

JAMES E. ROGAN
*Director of the United States Patent and Trademark Office*